United States Patent [19]
Vonesch

[11] Patent Number: 5,918,451
[45] Date of Patent: Jul. 6, 1999

[54] DUAL LIFTING SYSTEM FOR ROTARY HAY RAKING MACHINE

[76] Inventor: Anthony R. Vonesch, RR 3, Site 10, Box 13, Olds, Alberta, Canada, T4H 1P4

[21] Appl. No.: 08/821,544

[22] Filed: Mar. 21, 1997

[30] Foreign Application Priority Data

Aug. 6, 1996 [CA] Canada ................................ 2182749

[51] Int. Cl.[6] .................................................. A01D 76/00
[52] U.S. Cl. .............................................. 56/365; 56/367
[58] Field of Search ............................. 56/384, 385, 396, 56/397, 380, 379, 377, 378, 376, 372, 366, 365, 367

[56] References Cited

U.S. PATENT DOCUMENTS

| 5,313,772 | 5/1994 | Tonutti | 56/384 |
| 5,377,482 | 1/1995 | Knigge | 56/370 |
| 5,502,959 | 4/1996 | Hansen | 56/380 |
| 5,784,873 | 7/1998 | Aron | 56/367 |

FOREIGN PATENT DOCUMENTS

| 344079A1 | 11/1989 | European Pat. Off. . | |
| 390713A1 | 10/1990 | European Pat. Off. . | |
| 399256A1 | 11/1990 | European Pat. Off. . | |
| 415 301 | 3/1991 | European Pat. Off. | 56/367 |
| 415301A1 | 3/1991 | European Pat. Off. . | |
| 455022A1 | 11/1991 | European Pat. Off. . | |
| 464387A1 | 1/1992 | European Pat. Off. . | |
| 484 794 | 5/1992 | European Pat. Off. | 56/365 |
| 484794A2 | 5/1992 | European Pat. Off. . | |
| 516939A2 | 12/1992 | European Pat. Off. . | |
| 517632A1 | 12/1992 | European Pat. Off. . | |
| 536071A1 | 4/1993 | European Pat. Off. . | |
| 554200A1 | 8/1993 | European Pat. Off. . | |
| 559023A1 | 9/1993 | European Pat. Off. . | |
| 600 304 A1 | 6/1994 | European Pat. Off. | 56/365 |
| 600304A1 | 6/1994 | European Pat. Off. . | |
| 622006A2 | 11/1994 | European Pat. Off. . | |
| 651938A1 | 5/1995 | European Pat. Off. . | |
| 517632 | 12/1992 | France | 56/372 |
| 516939 | 12/1992 | Germany | 56/372 |

*Primary Examiner*—Terry Lee Melius
*Assistant Examiner*—Arpad Fabian Kovacs
*Attorney, Agent, or Firm*—Thomas E. Malyszko

[57] ABSTRACT

A hay raking machine of the present invention for attachment to a tractor with a single point hitch has a lifting mechanism for lifting the hay raking machine above cut hay laying on the ground while keeping the rake arms substantially level to the ground. The lifting mechanism employs two hydraulic cylinders working in tandem, with one cylinder located at the rear of the machine below the cam assembly for the rake arms, and the other cylinder located at the front of the machine which attaches to the single point hitch. The front cylinder cooperates with an assembly of four hitch arms in a parallelogram configuration for raising and lowering the front of the machine in unison with the rear of the machine. A farmer therefore has control over the height of the hay raking machine and its raking arms both during raking operations and during transport over roads or other potentially damaging surfaces.

15 Claims, 9 Drawing Sheets

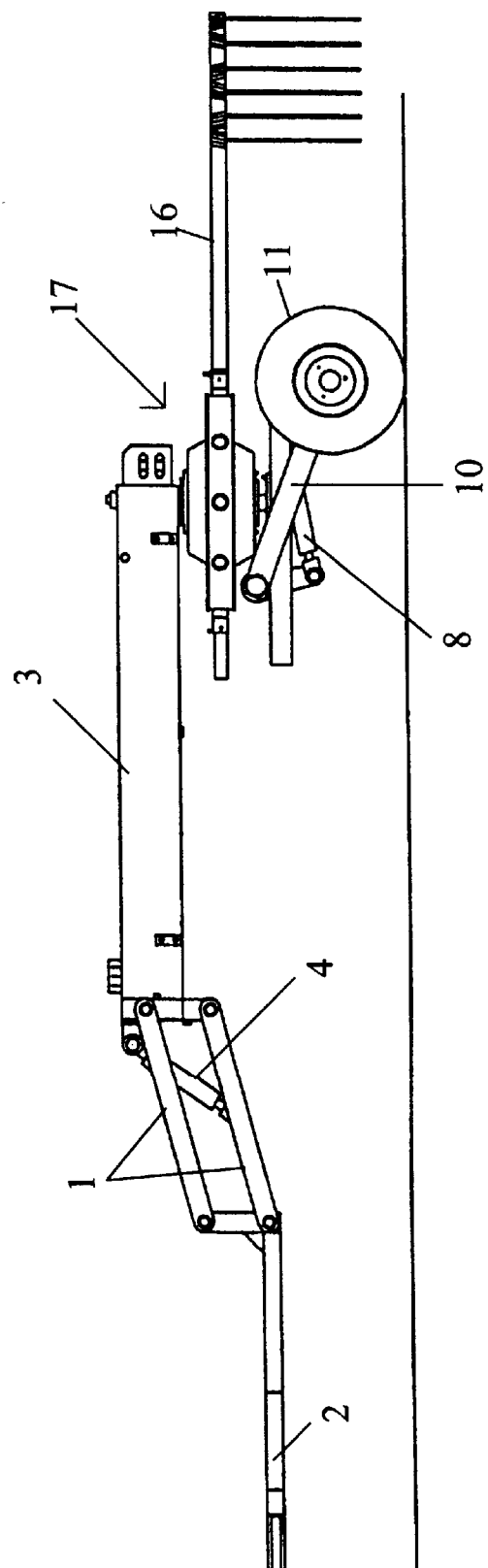
View 1

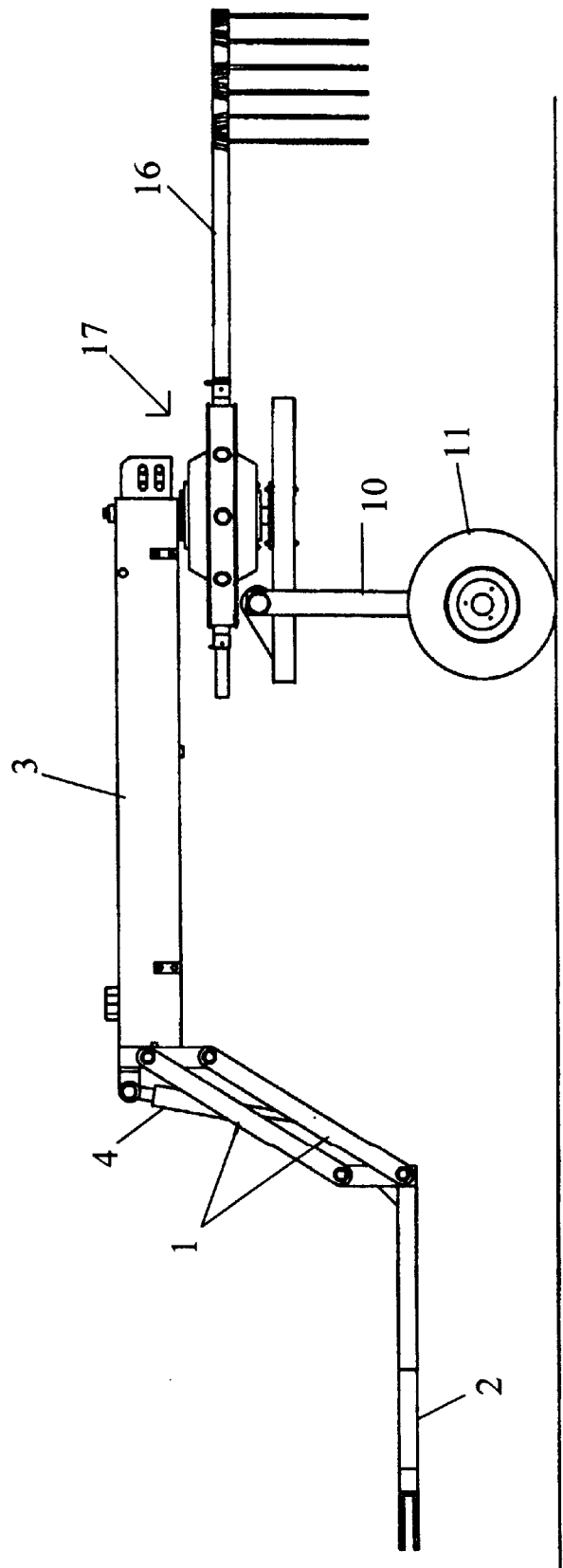

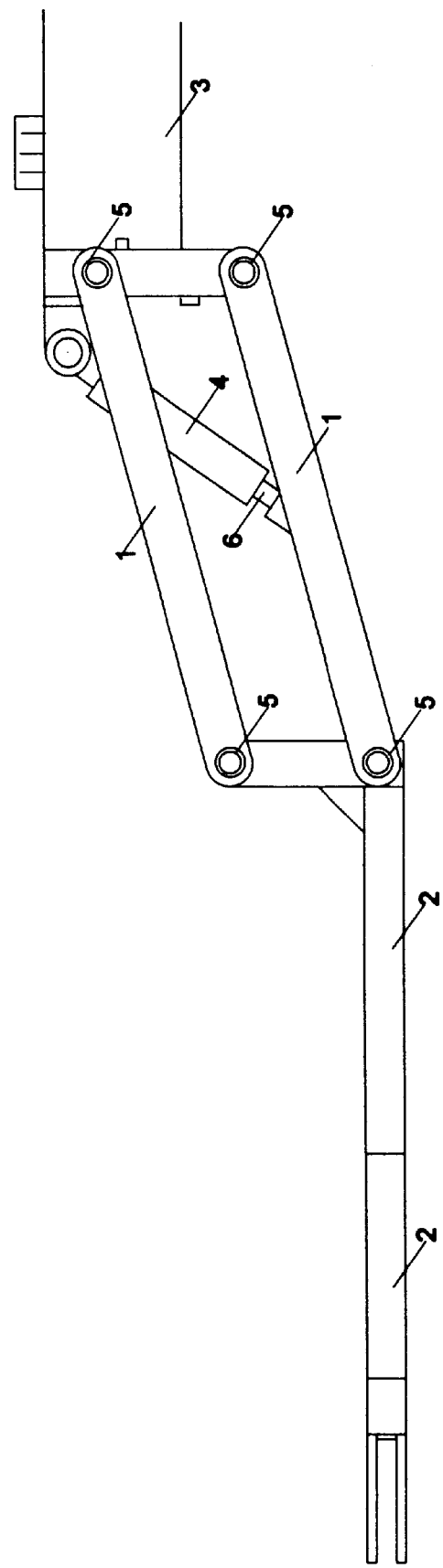

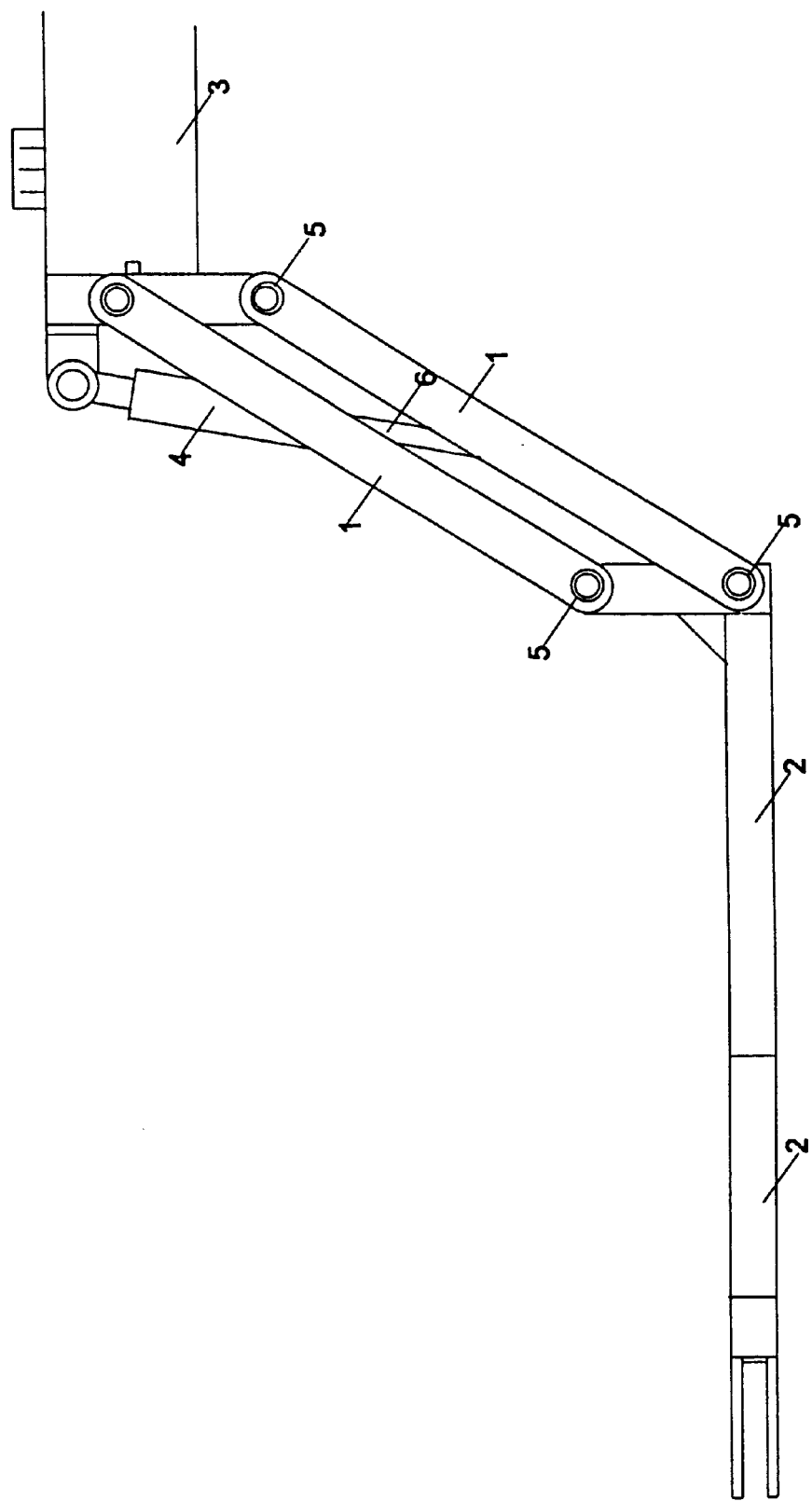

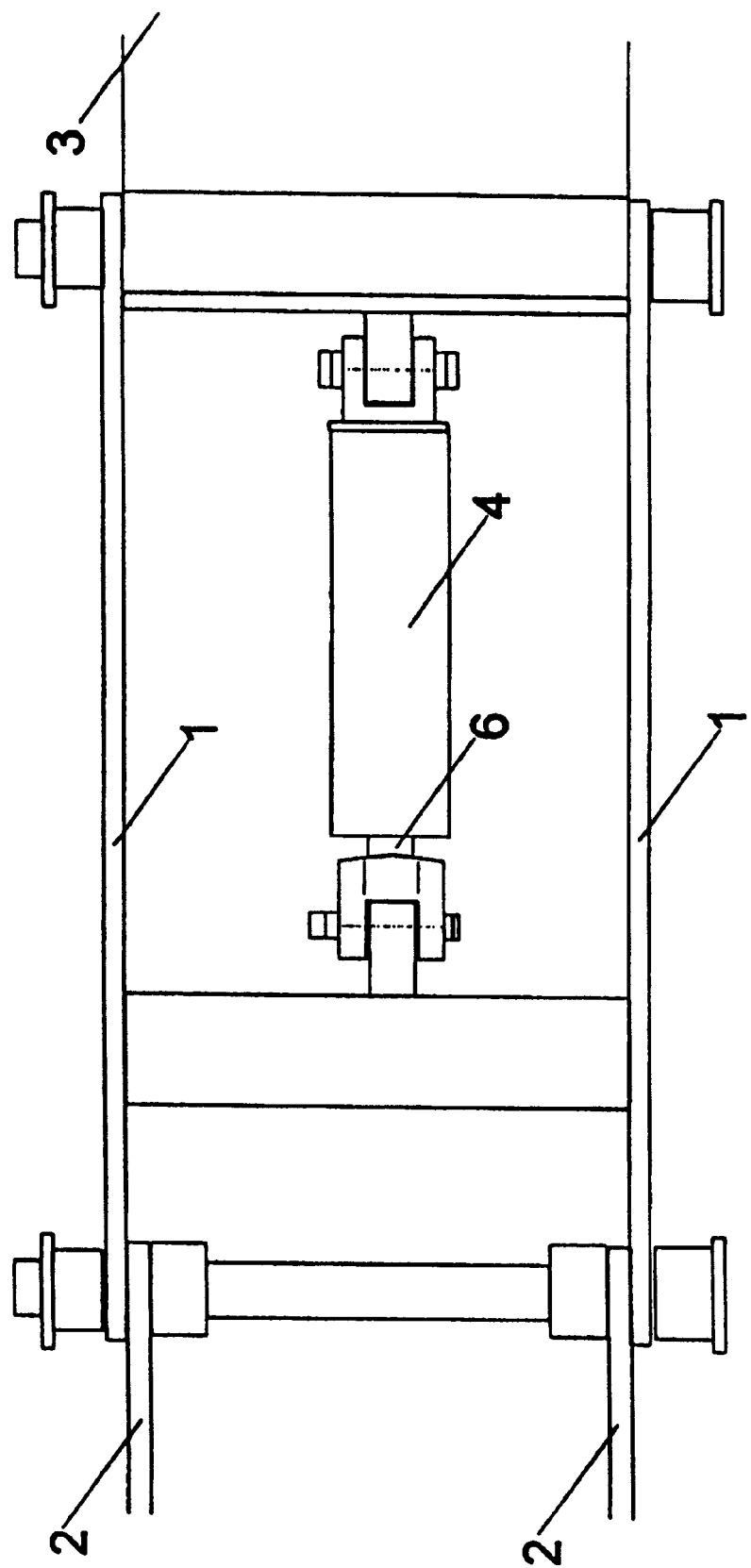

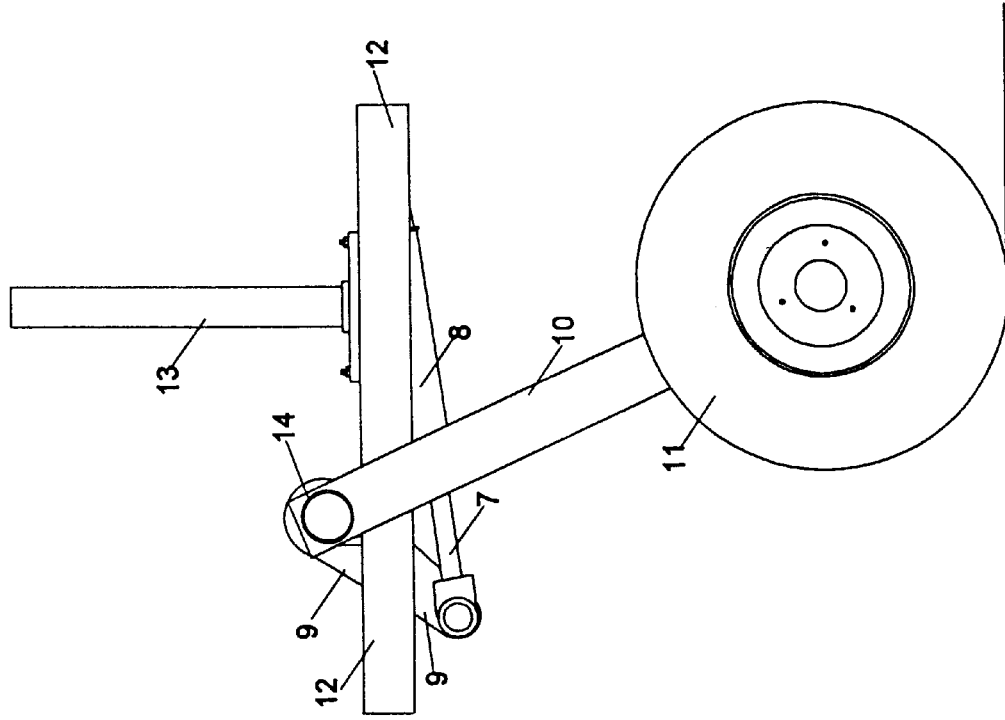
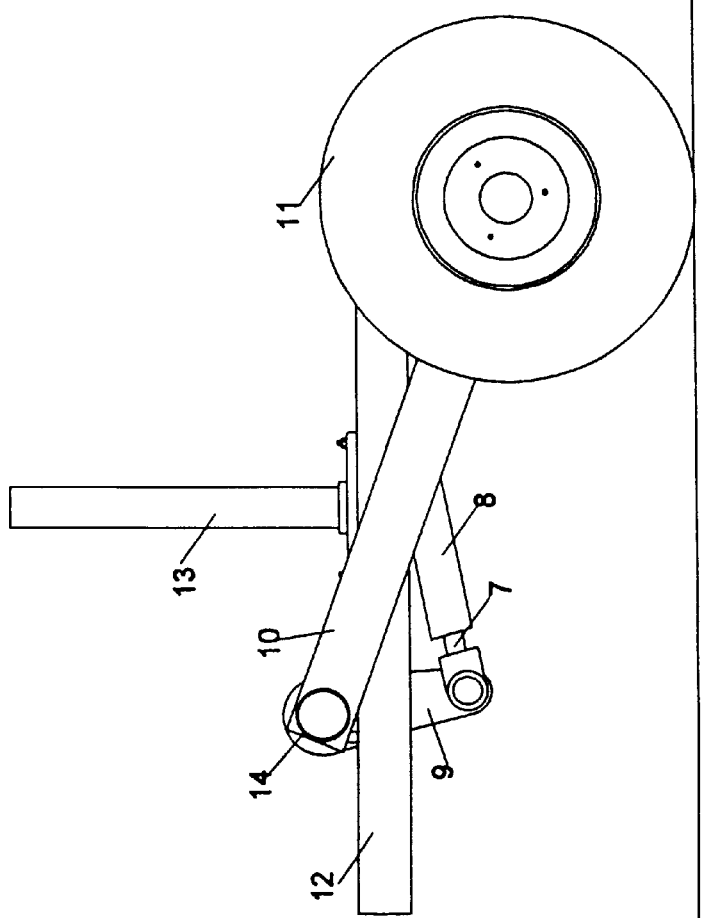

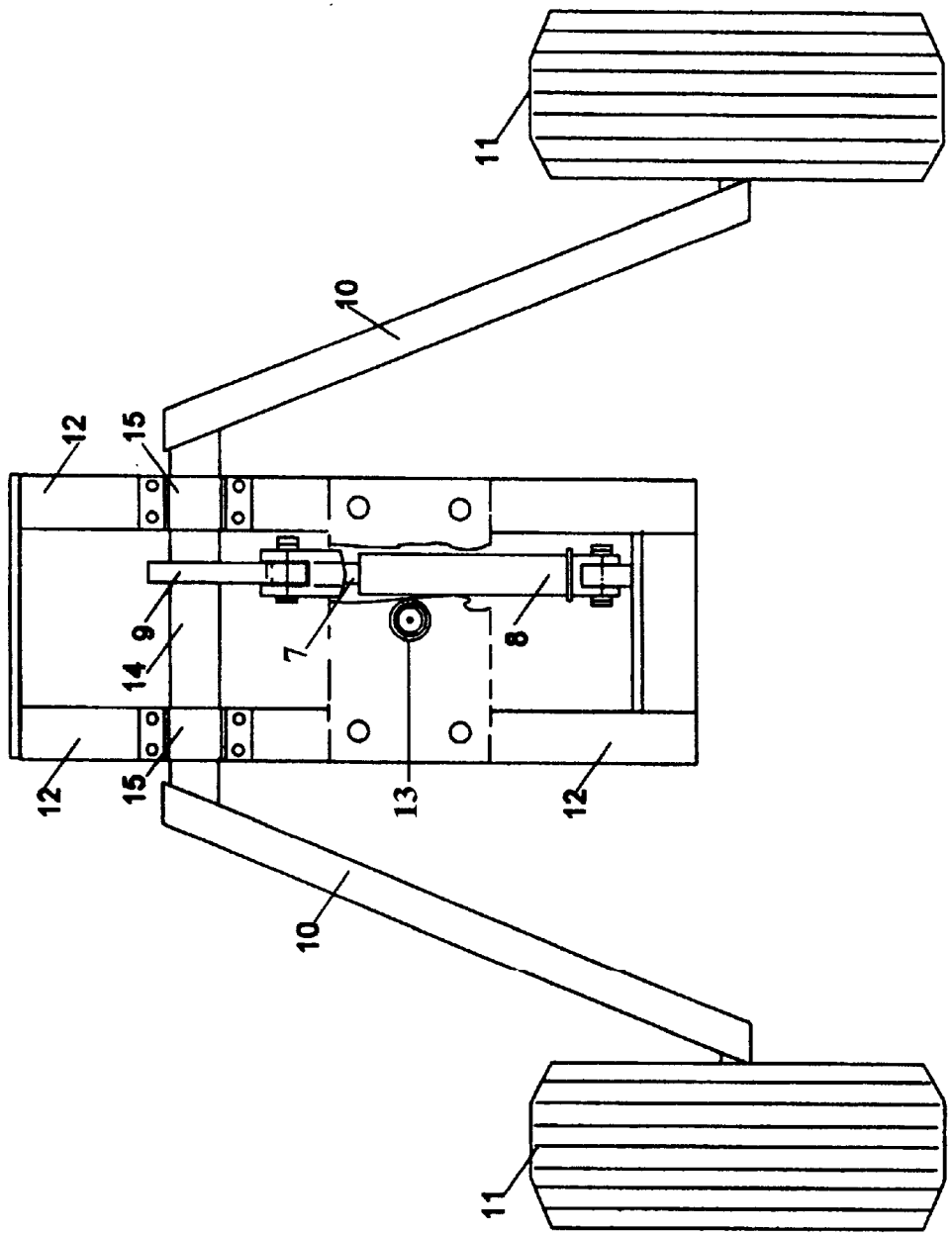

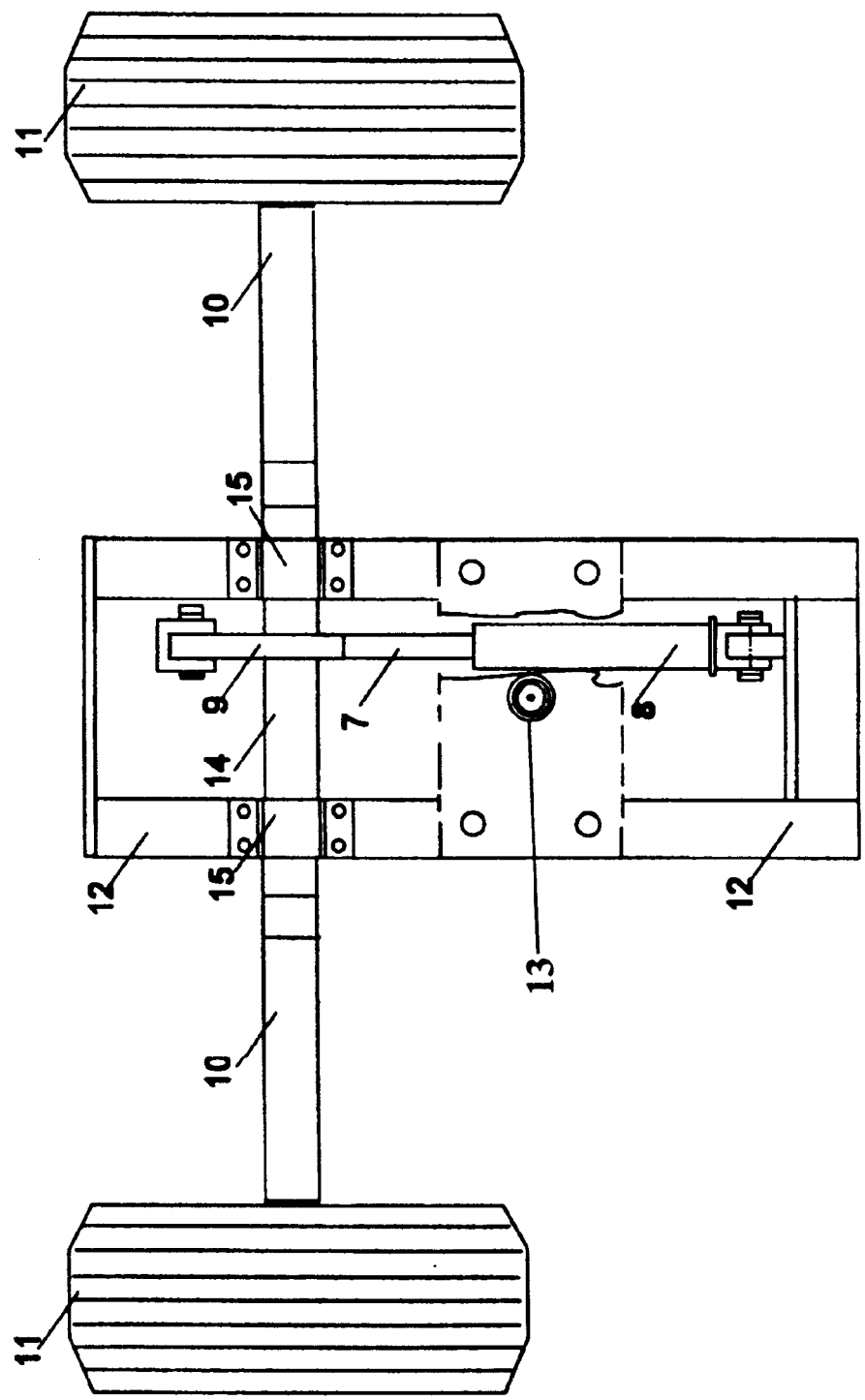
View 9

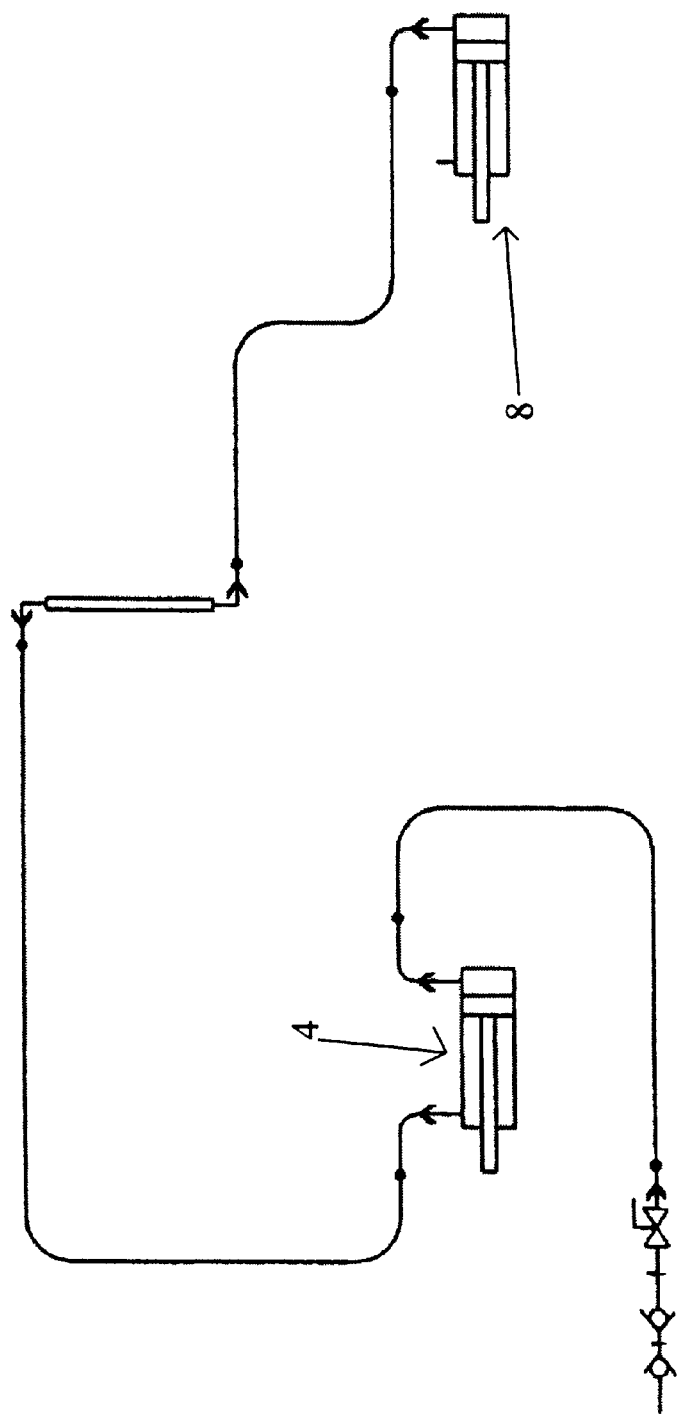

DUAL LIFTING SYSTEM FOR ROTARY HAY RAKING MACHINE

This invention relates to a lifting mechanism for lifting and lowering the height of a hay raking machine.

When hay in the field is cut, it is left to dry before being baled. The hay stores better if its moisture content is low. To help the drying process a hay raking machine is often used to turn the cut hay. The hay may be raked several times if the weather prevents fast drying of the hay. It is common in hay raking machines when attached to a single point hitch behind a tractor, for there to be no way of lifting the hay rakes satisfactorily. Manual mechanisms only lift the machines by a few inches, are time consuming to use and cannot be operated while the driver is still in the tractor seat Machines of this type are, however, inefficent because the farmer has to rake back over some of the hay he has already raked. They are, also, unsatisfactory because when the farmer needs to move the machine between fields, or transport it on a road, he has to get off the tractor to manually lift the mechanism or alternatively risk grounding the rakes. This is dangerous and also, could damage the rakes.

I have found that these disadvantages can be overcome by using two mechanism, one at the front and one at the back, for lifting the machinery by up to 24 inches substantially horizontally from the ground. These are powered remotely from the tractor by means of hydraulics and operate in tandem.

When the hydraulic switch is operated in the tractor, two hydraulic cylinders are activated. These retract to lower the mechanisms, or expand to raise them. The invention also allows the mechanism to be set and remain at specific heights as determined by the operator.

Drawings which illustrate embodiments of the invention are as follows:

View 1 Overview-Side Elevation-Lowered Position Invention in place on semi-cutaway 10 arm rotary Hay Rake View 2 Overview-Side Elevation-Raised Position Invention in place on semi-cutaway 10 arm rotary Hay Rake View 3 Front Mechanism-Side Elevation-Detail Lowered Position View 4 Front Mechanism-Side Elevation-Detail Raised Position View 5 Front Mechanism-Top Elevation View 6 Undercarriage-Side Elevation-Detail Lowered Position View 7 Undercarriage-Side Elevation-Detail Semi-Raised Position View 8 Undercarriage-Top Elevation-Detail Lowered Position View 9 Undercarriage-Top Elevation-Detail Raised Position View 10 Schematic illustration of hydraulic lifting mechanism Views 1 & 2 show the two parts of the invention attached to a typical ten arm rotary hay rake with one arm 16 being shown for illustrative purposes. This machine is shown as a part cutaway to help illustrate how the front mechanism and undercarriage are positioned on the machine. View 1 shows the machine in a lowered position and View 2 shows how the machine is lifted by the invention while retaining the rake arms 16 level (i.e. in a generally horizontal orientation) to the ground.

View 3 shows how, on the front mechanism, four hitch arms 1 are configured in a parallelogram manner and attached to the single point hitch assembly 2 on one end and to the tank 3 at the other end. A hydraulic cylinder 4 is located between these arms; it is also attached to the tank 3 and the hitch assembly 2. These arms pivot on bushings 5. View 3 shows the front assembly in a typical lowered position with the hydraulic cylinder 4 in a retracted position. When the hyrdraulics are activated the cylinder 4 will push or pull the hydraulic ram 6 to cause the hitch arms 1 to move.

View 4 shows detail of the front mechanism in a raised position and shows what happens when the hydraulic ram 6 has been pushed out of the cylinder 4. The hitch arms 1 pivot on the bushings 5. This action causes the arms 1 on each side to move closer together.

View 5 is a top elevation and shows further how the parallelogram works. It also shows how the arms 1 are attached to the hitch 2 and the tank 3. views 6 and 7 illustrate the undercarriage assembly from a side elevation and how the back or rear lifting mechanism looks in operation. View 6 shows the undercarriage lowered with the hydraulic ram 7 of the undercarriage hydraulic cylinder 8 fully retracted. This is linked to an activating arm 9 that is attached to the undercarriage axle 14 and the wishbone tubes 10 that hold the wheels 11. The undercarriage assembly is attached to the undercarriage frame 12 which hold the main shaft 13. A cam assembly 17 (views 1 and 2) travels about the main shaft 13 and rotates the rake arms 16 in a known manner.

View 7 has been shown in a semi-lifted mode to illustrate how the hydraulic cylinder moves upward as the ram 7 pushes out from the cylinder 8. The cylinder 8 moves to a horizontal position in a fully lifted situation and cannot been seen in a side elevation as it is positioned completely within the undercarriage frame.

Views 8 and 9 illustrate how the wishbone arms 10 support the wheels 11 and are linked to the undercarriage axle 14 and the activating arm 9. These parts 9, 10 11, 14, are all joined together to pivot on undercarriage clamps 15. View 8 shows the undercarriage in a lowered position and View 9 shows a raised position.

The lifting mechanism is actuated hydraulically as shown schematically in View 10. The front hydraulic cylinder 4 is a typical 2.5 in.×8 in. rephasing cylinder. The rear hydraulic cylinder 8 is a 2 in.×8 in. ordinary cylinder. The difference in size of the hydraulic cylinders 4 & 8 together with the configuration of the hydraulic lines, i.e. in series, allows the displacement of the hydraulic cylinders to remain approximately the same and therefore lift the machine substantially horizontally. Hence, the raking machine does not tip down at the front as do prior art machines, and so the rake arms 16 facing the front and rear of the raking machine are at about equal heights above the cut hay on the ground. The small displacement difference is rectified by the rephasing cylinder at the end of its stroke. It will also be understood from the foregoing that the hydraulic lifting mechanism is "one way" in that the rake is lowered (from the view 2 position toward the view 1 position) by deactivating the hydraulics and allowing the cylinders 4 and 8 to retract by the force of gravity, namely by the weight of the rake.

The above description is intended in an illustrative rather than a restrictive sense and variations to the specific configurations described may be apparent to skilled persons in adapting the present invention to specific applications. Such variations are intended to form part of the present invention insofar as they are within the spirit and scope of the claims below.

I claim:

1. A rotary hay raking machine for use with a tractor having a single point hitch, said raking machine comprising:
   a frame having an undercarriage wheel assembly for transporting the raking machine over a ground surface;

a cam assembly mounted to the frame for rotating a plurality of rake arms extending radially from said cam assembly;

a hitch assembly located at a front end of said raking machine and pivotally connected thereto for attaching said raking machine to said single point hitch of the tractor for pulling said raking machine over said ground surface;

a lifting system having a front lifting mechanism adjacent said hitch assembly and a rear lifting mechanism beneath said cam assembly, said front and rear lifting mechanisms being operable to raise and lower said frame such that each of said raking arms remain substantially level to the ground surface.

2. The raking machine of claim 1 wherein:

said front lifting mechanism includes a first hydraulic cylinder;

said rear lifting mechanism includes a second hydraulic cylinder; and, said lifting system includes a hydraulic arrangement for operating said first and second hydraulic cylinders in tandem for raising and lowering said frame and raking arms substantially level to the ground surface.

3. The raking machine of claim 2 wherein said front lifting mechanism further includes a plurality of arms forming a parallelogram arm arrangement operable by said first hydraulic cylinder for lifting a front end of said frame relative to said hitch assembly.

4. The raking machine of claim 3 wherein:

said front end of the frame includes a hydraulic fluid storage tank; and, said parallelogram arm arrangement comprises two sets of opposed top and bottom hitch arms wherein each of said hitch arms is pivotally connected at one end to the hitch assembly and at the opposed end to the tank, and wherein respective top and bottom hitch arms are brought closer together upon said front linkage lifting said front end of the frame.

5. The raking machine of claim 3 wherein said rear lifting mechanism further includes said second hydraulic cylinder attached at one end to said frame and at an opposed end to a wishbone linkage comprising an activating arm having a first end pivotally connected to said second hydraulic cylinder and an opposed second end fixed to a wishbone arm carrying a plurality of wheels for transporting said raking machine over the ground surface.

6. The raking machine of claim 2 wherein said hydraulic arrangement comprises a single hydraulic line extending between said first and second hydraulic cylinders for allowing a tractor operator to activate hydraulic fluid to extend the first and second cylinders and thereby lift the frame, and to deactivate the hydraulic fluid to allow the first and second cylinders to retract under force of gravity and thereby lower the frame.

7. A hay raking machine comprising:

a transportable frame carrying a plurality of rotatable rake arms;

a hitch assembly at a front end of said frame for attachment to a single point hitch of a tractor for moving said frame over a ground surface;

a lifting system on said frame comprising:

a front mechanism, including a first hydraulic cylinder for operating said front mechanism, pivotally connected behind said hitch assembly;

a rear mechanism, including a second hydraulic cylinder for operating said rear mechanism, pivotally connected to said frame beneath said rake arms; and a hydraulic system for operating said first and second cylinders to raise and lower said frame such that each of said raking arms remains substantially level to the ground surface.

8. The hay raking machine of claim 7 wherein said front mechanism comprises a plurality of fixed length arms forming a parallelogram arm arrangement operable by said first hydraulic cylinder for lifting a front end of said frame relative to said hitch assembly.

9. The hay raking machine of claim 8 wherein said parallelogram arm arrangement comprises two sets of opposed top and bottom hitch arms, each of said hitch arms being pivotally connected at one end to the hitch assembly and at an opposed end to said front end of the frame, wherein respective top and bottom hitch arms are brought closer together upon said front mechanism lifting said frame.

10. The hay raking machine of claim 9 wherein said first hydraulic cylinder is operatively connected at one end to said frame and at an opposed end to said bottom hitch arms.

11. The raking machine of claim 7 wherein said second hydraulic cylinder is operatively attached at one end to said frame and at an opposed end to a wishbone linkage comprising an activating arm having a first end pivotally connected to said second hydraulic cylinder and an opposed second end fixed to a wishbone arm carrying a wheel for rolling said raking machine over the ground surface.

12. The raking machine of claim 8 wherein said second hydraulic cylinder is attached at one end to said frame and at an opposed end to a wishbone linkage comprising an activating arm having a first end pivotally connected to said second hydraulic cylinder and an opposed second end fixed to a wishbone arm carrying a wheel for rolling said raking machine over the ground surface.

13. The raking machine of claim 9 wherein said second hydraulic cylinder is attached at one end to said frame and at an opposed end to a wishbone linkage comprising an activating arm having a first end pivotally connected to said second hydraulic cylinder and an opposed second end fixed to a wishbone arm carrying a wheel for rolling said raking machine over the ground surface.

14. The raking machine of claim 10 wherein said second hydraulic cylinder is attached at one end to said frame and at an opposed end to a wishbone linkage comprising an activating arm having a first end pivotally connected to said second hydraulic cylinder and an opposed second end fixed to a wishbone arm carrying a wheel for rolling said raking machine over the ground surface.

15. The raking machine of claim 7 wherein said hydraulic system comprises a single hydraulic line extending between said first and second hydraulic cylinders for allowing a tractor operator to activate hydraulic fluid to extend the first and second cylinders and thereby lift said frame, and to deactivate the hydraulic fluid to allow the first and second cylinders to retract under force of gravity and thereby lower said frame.

* * * * *